June 14, 1938. A. H. CUDDON-FLETCHER 2,120,886
ROTARY VALVE OF INTERNAL COMBUSTION ENGINES AND THE LUBRICATION THEREOF
Filed May 5, 1937
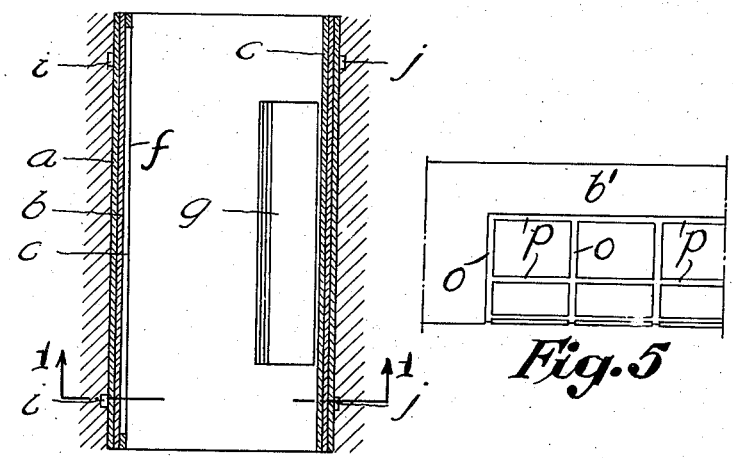
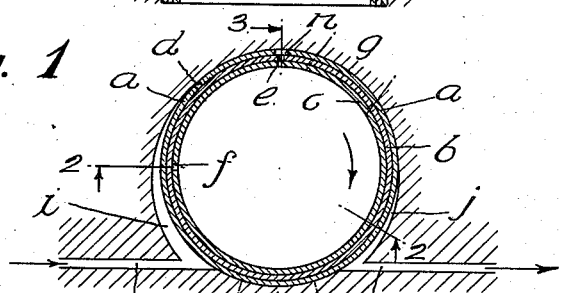
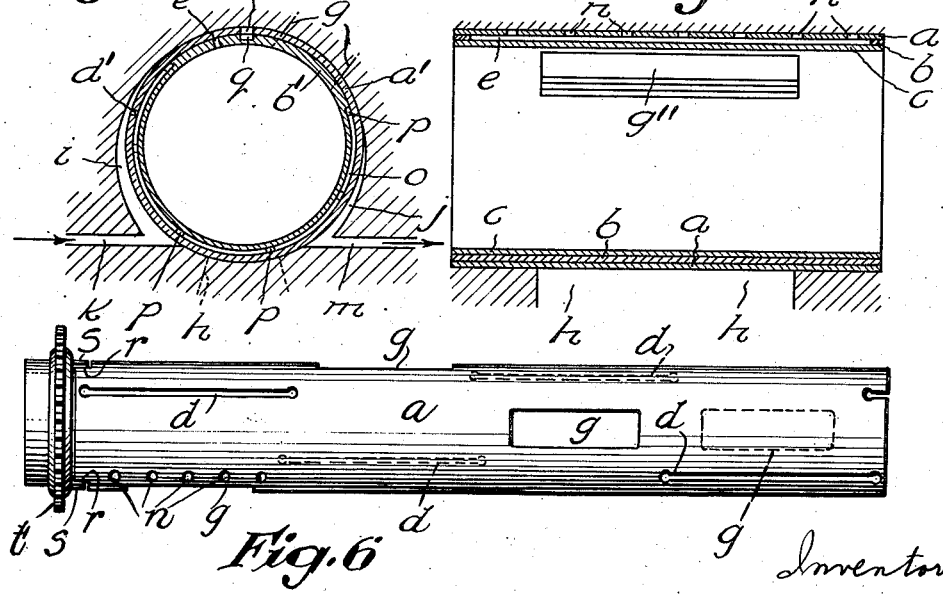

Patented June 14, 1938

2,120,886

UNITED STATES PATENT OFFICE 2,120,886

ROTARY VALVE OF INTERNAL-COMBUSTION ENGINES AND THE LUBRICATION THEREOF

Angus Humphrey Cuddon-Fletcher, Hoby, England

Application May 5, 1937, Serial No. 140,941
In Great Britain May 9, 1936

13 Claims. (Cl. 123—190)

This invention relates to rotary valves for internal combustion engines of the kind in which the valve comprises more than one sleeve assembled one within the other but rotating as one, and provided with ports in corresponding positions, and in which these ports are brought by rotation of the valve into and out of register with ports in an engine cylinder or cylinders, for the admission of fluid or gaseous mixtures to the cylinder or cylinders, or for permitting exhaust therefrom.

In the specification of a prior Patent 2,078,723 dated April 4, 1937, I have described a valve having sleeves provided with a plurality of circumferentially displaced slots or gaps longitudinally arranged, which, while individually short, collectively extend for substantially the whole length of the sleeves, as they overlap each other where they are displaced circumferentially. These slots or gaps are primarily intended to provide for expansion and contraction under temperature changes, but also serve for lubricant distribution.

In accordance with the present invention I combine with an arrangement of expansion absorbing gaps or slots in the sleeves of a rotary valve of this character, i. e. individually short, circumferentially displaced, but overlapping slots, an arrangement of oil feed passages or ducts, preferably of the Michell oil-wedge type, in the bore in which the valve rotates. These ducts are arranged in the cross section of the bore between the port orifices and where the ends of the slots in the sleeves will overlap each other. The duct will run substantially circumferentially in the bore, and will thus cross the ends of the various slots which are out of line with each other around each sleeve, and are out of register in the various sleeves.

The ends of the slots are brought into communication with the ducts as the valve rotates. By providing oil inlet or pressure ducts and oil outlet or suction ducts displaced circumferentially around the bearing or bore, the slots are filled from their ends with oil as they pass the inlet ducts, and the used oil is extracted as the ends of the slots pass the suction or outlet ducts on the other side of the bearing. The ducts can thus be arranged in relation to the valve so that the slots are always substantially free from oil when they pass over the cylinder ports, as each slot passes a port before reaching the inlet duct, and then passes the outlet duct before reaching the fixed port again.

In my aforesaid patent I described an arrangement of oil holes in the outer sleeve, permitting lubricant to pass to the sleeve or sleeves within it. I may arrange such oil holes in the outer sleeve at points where they will register with the slots in the sleeve within the outer sleeve. The slots in the inner sleeve or the middle sleeve if there are three, may thus be placed in direct communication with the ducts as the orifices in the outer sleeve pass the inlet and outlet oil ducts.

In the appended drawing I have illustrated two constructional examples of the invention.

Figure 1 illustrates in cross section on line 1—1 of Figure 2, a three sleeve rotary valve in relation to a fixed port in a cylinder head.

Figure 2 is a longitudinal section on the line 2—2 of Figure 1.

Figure 3 is a similar view on line 3—3 of Figure 1.

Figure 4 is a cross section similar to Figure 1 but showing a modification.

Figure 5 is an elevation of a portion of the inner sleeve seen in Figure 3.

Figure 6 is an elevation of the outer sleeve of a complete four cylinder engine sleeve valve.

In the construction shown in Figures 1, 2, and 3, $a$ is the outer sleeve, $b$ is the intermediate sleeve, and $c$ the inner sleeve of a three sleeve rotary valve similar to that set forth in my Patent No. 2,078,723, $d$ is one of the expansion slots in the outermost sleeve which are referred to in that specification, which described a valve for a four cylinder engine. The reference character $e$ is a corresponding slot in the intermediate sleeve $b$, and $f$ is the corresponding slot in the innermost sleeve $c$. The position of the port, or one of the ports of a multi-cylinder engine valve, is shown by the dotted lines $g$, which for clearness are continued outside the sleeves. The fixed port in the cylinder head is indicated in broken lines at $h$.

The oil feed ducts which are used in conjunction with the slots $d$, $e$ and $f$, are indicated at $i$ and $j$. They are part circumferential, and communicate with supply and outlet passages $k$ and $m$. The valve is assumed to be rotating in a clockwise direction in Figure 1, and ducts $i$ and supply passages $k$ are on the oil pressure side, and the ducts $j$ and outlet passage $m$ are on the suction side of any suitable supply system. If the arrangement is not part of a pressure supply system, oil would be supplied from a collection reservoir to the passages $k$, and the passage $m$ would lead to a drain, say to the engine sump.

As will be seen from Figure 1, the ducts $i$ are wedge like in cross section through the valve, tapering in the direction of rotation of the valve in the bearing. Oil is thus carried toward the restricted end of said ducts, where a pressure increase occurs which ensures an effective supply to the slots as they pass these ducts $i$. On the other hand there is the increase in size of the ducts $j$ as the outlet passage $m$ is approached, so as to facilitate emptying the slots before the fixed port $h$ is reached.

It is preferred, in addition to the slots in the outer sleeve $a$, to provide a series of holes $n$ in this sleeve opposite the slot $e$, or each of the slots $e$ in the intermediate sleeve $b$, so that the slot (or slots) $e$ in this sleeve will be fed with oil direct as that portion of the valve passes the inlet duct $i$.

The modification shown in Figures 4 and 5 as applied to a two sleeve rotary valve, may be used with valves of more sleeves if desired. The arrangement is similar to the construction previously described, but is designed to form practically a continuous film of oil between the sleeves. For this purpose a number of part-circumferential channels $o$ are formed in the outer wall of the inner sleeve $b'$ of the valve. Those channels will be arranged at various places along the sleeve according to requirements; but all or some of the channels $o$ cross the slot $d'$ in the outer sleeve $a'$, so that they are fed with oil therefrom as that slot passes the duct $i$. The various channels $o$ are placed in communication with each other by means of longitudinal grooves $p$ in the sleeve surface.

As shown in Figure 4, the slot $e'$ in the sleeve $b'$ is shown removed from the area over which the circumferential channels $o$ are arranged. In this part of the sleeve between the ends of the channels $o$ and the port $g$, an axial groove or reservoir $q$ may be cut into which a series of oil holes $n'$ in the outer sleeve $a'$ may lead. This arrangement carries around a charge of oil for the wall of the bearing or bore.

Figure 6 is an elevation of the outer sleeve of a complete four cylinder engine sleeve valve, showing an arrangement of expansion slots $d$, ports $g$, and oil holes $n$, similar to that of my Patent No. 2,078,723.

Any suitable means for rotating the sleeves may be used, and in Fig. 6 one embodiment is shown wherein $t$ indicates a suitably driven gear driven by any suitable means (not shown). Laterally extending lugs $s$ of the gear $t$ engage in suitable slots $r$ formed in one end of the sleeves, whereby rotation of the gear drives the sleeves.

I claim:

1. Rotary valve arrangement for internal combustion engines comprising a plurality of sleeves fitting one within another, each having a port aperture in corresponding positions; a bore in which the valve rotates and having formed therein a port orifice leading to the cylinder or cylinders of the engine; means for rotating the sleeves as a composite valve, slots in the sleeves for absorbing expansion, oil ducts leading to the bore, but out of alignment with the port, said ducts and the slots in the outermost sleeve communicating with each other as the valve rotates.

2. Rotary valve arrangement for internal combustion engines comprising in combination a plurality of concentric sleeves rotating as one, port apertures therein in corresponding positions, a bore in which the valve rotates and having formed therein port orifices leading therefrom to the engine cylinders, said orifices co-operating with the port apertures in the valve as the latter rotates, expansion absorbing slots in the sleeves of the valves out of line with those in the other sleeves; oil ducts in the bore at places out of line with the port orifices, the slots in the outermost sleeve communicating with the ducts as the valve rotates; series of holes in the outer sleeve, and means in the next sleeve within said outermost sleeve to place the holes of a series in communication with each other and with ducts in the bore as the valve rotates.

3. Rotary valve arrangement for internal combustion engines comprising in combination a plurality of concentric sleeves rotating as one, port apertures therein in corresponding positions, a bore in which the valve rotates and having formed therein port orifices leading therefrom to the engine cylinders, said orifices co-operating with the port apertures in the valve as the latter rotates, expansion absorbing slots in the sleeves of the valves out of line with those in the other sleeves; oil ducts in the bore at places out of line with the port orifices, the slots in the outermost sleeve communicating with the ducts as the valve rotates; series of holes in the outer sleeve, and means in the next sleeve within said outermost sleeve to place the holes of a series in communication with each other and with ducts in the bore as the valve rotates, said means comprising one of the expansion slots in said inner sleeve.

4. Rotary valve arrangement for internal combustion engines comprising in combination a plurality of concentric sleeves rotating as one, port apertures therein in corresponding positions, a bore in which the valve rotates and having formed therein port orifices leading therefrom to the engine cylinders, said orifices co-operating with the port apertures in the valve as the latter rotates, expansion absorbing slots in the sleeves of the valves out of line with those in the other sleeves; oil ducts in the bore at places out of line with the port orifices, the slots in the outermost sleeve communicating with the ducts as the valve rotates; series of holes in the outer sleeve, and means in the next sleeve within said outermost sleeve to place the holes of a series in communication with each other and with ducts in the bore as the valve rotates, said means comprising one of the expansion slots in said inner sleeve, and a channel in the outer surface of said inner sleeve disposed under said series of holes in the outer sleeve.

5. Rotary valve arrangement for internal combustion engines comprising a plurality of sleeves fitting one within another, each having a port aperture in corresponding positions; a bore in which the valve rotates and having formed therein a port orifice leading to the cylinder or cylinders of the engine; means for rotating the sleeves as a composite valve, slots in the sleeves for absorbing expansion, oil ducts leading to the bore, but out of alignment with the port, said ducts and the slots in the outermost sleeve communicating with each other as the valve rotates, certain of said ducts serving as inlet oil ducts and others as outlet oil ducts the inlet ducts being arranged so that oil may be taken up by the slots in the sleeve and carried around in said bore and the outlet ducts serving to remove oil from the slots before the cylinder ports are reached by said slots as the valve rotates.

6. Rotary valve arrangement for internal combustion engines comprising a plurality of sleeves fitting one within another, each having a port aperture in corresponding positions; a bore in which the valve rotates and having formed therein a port orifice leading to the cylinder or cylinders of the engine; means for rotating the sleeves as a composite valve, slots in the sleeves for absorbing expansion, oil ducts leading to the bore, but out of alignment with the port, said ducts and the slots in the outermost sleeve communicating with each other as the valve rotates, said ducts being of a shape to cause a reduction in cross sectional area of the inlet ducts in the direction of rotation of the valve.

7. Rotary valve arrangement for internal combustion engines in which the valve comprises a plurality of ported sleeves arranged for rotating together and having a series of expansion absorbing slots along each sleeve, the slots in one sleeve being out of register with those in the next sleeve; a bore in which the valve is arranged to be rotated; oil ducts in the bore of tapering form in cross section, and cylinder ports in the bore, the ducts being out of the line of these ports but the slots in the outermost sleeve crossing the oil ducts so as to take up oil therefrom as the valve rotates.

8. Rotary valve arrangement for internal combustion engines in which the valve comprises a plurality of ported sleeves arranged for rotating together and having a series of expansion absorbing slots along each sleeve, the slots in one sleeve being out of register with those in the next sleeve; a bore in which the valve is arranged to be rotated; oil ducts in the bore of tapering form in cross section, and cylinder ports in the bore, the ducts being out of the line of these ports and certain of the ducts being arranged to form oil inlets and others circumferentially displaced therefrom forming oil outlets; the slots in the outermost sleeve of the valve being arranged to cross the oil ducts as the valve rotates so as to take up a supply of oil from the inlet ducts and carry this around in the bearing until the outlet ducts are reached by said slots when oil is released before the respective slots reach the corresponding cylinder ports.

9. Rotary valve arrangement for internal combustion engines comprising a plurality of sleeves fitting one within another, each having a port aperture in corresponding positions; a bore in which the valve rotates and having formed therein a port orifice leading to the cylinder or cylinders of the engine; means for rotating the sleeves as a composite valve, slots in the sleeves for absorbing expansion, oil ducts leading to the bore out of alignment with the port, said ducts and the slots in the outermost sleeve communicating with each other as the valve rotates; an arrangement of channels between the respective sleeves of the valve and means for supplying these channels with oil so as to form a sealing film of oil between the sleeves.

10. Rotary valve arrangement for internal combustion engines comprising a plurality of sleeves fitting one within another, each having a port aperture in corresponding positions; a bore in which the valve rotates and having formed therein a port orifice leading to the cylinder or cylinders of the engine; means for rotating the sleeves as a composite valve, slots in the sleeves for absorbing expansion, oil ducts leading to the bore out of alignment with the port, said ducts and the slots in the outermost sleeve communicating with each other as the valve rotates; an arrangement of channels between the respective sleeves of the valve, said channels being part circumferential, communicating grooves between the channels, and means for supplying these channels with oil so as to form a sealing film of oil between the sleeves.

11. Rotary valve arrangement for internal combustion engines comprising a plurality of ported sleeves rotated within a bore having cylinder ports therein with which the valve ports communicate during rotation of the valve, slots for absorbing expansion arranged in the respective sleeves of the valve out of register with each other and oil ducts arranged in the bore out of line with the ports therein, the ducts being part-circumferential and tapering in cross section and the slots in the outer sleeve of the valve communicating with the duct as the valve rotates; part-circumferential channels between the sleeves of the valve said channels being fed with oil from the said ducts by means of communication therewith through the slots in the outermost sleeve; series of holes in the outer sleeve and channels running along the sleeve next within that and along the respective series of holes, these channels serving to place all the holes in communication with each other and with the said oil ducts, and said holes and their channels being located at that part of the sleeves free from the part-circumferential channels.

12. Rotary valve arrangement for internal combustion engines comprising the combination with valves of more than one sleeve having expansion absorbing slots therein, a bore mounting said sleeves for rotation therein, means for simultaneously rotating all of said sleeves as one, cylinder port orifices in said bore, of oil feed ducts in the bore of the valve between the port orifices in such positions that the slots will communicate with said ducts as the valve rotates.

13. Rotary valve arrangement for internal combustion engines comprising the combination in valves with a plurality of sleeves, a bore mounting said sleeves for rotation therein, means for simultaneously rotating all of said sleeves as one, cylinder port orifices in said bore, of expansion absorbing slots which are individually short but are circumferentially displaced and overlap each other, and oil feed ducts arranged in the bore of the valve between the port orifices and where the slots overlap so as to communicate with the slots; the ducts being substantially wedge shaped in cross section, those on the inlet side tapering toward the direction of rotation of the valve.

ANGUS HUMPHREY CUDDON-FLETCHER.